United States Patent
Aryeetey et al.

(10) Patent No.: US 10,685,317 B2
(45) Date of Patent: Jun. 16, 2020

(54) TRACKABLE POSTAGE

(71) Applicant: United States Postal Service, Washington, DC (US)

(72) Inventors: Nii-Kwashie Aryeetey, Accokeek, MD (US); Markes Lucius, Arlington, VA (US); Matthew J. Mazzola, Washington, DC (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 387 days.

(21) Appl. No.: 15/272,166

(22) Filed: Sep. 21, 2016

(65) Prior Publication Data
US 2017/0083861 A1 Mar. 23, 2017

Related U.S. Application Data

(60) Provisional application No. 62/222,032, filed on Sep. 22, 2015.

(51) Int. Cl.
 *G06Q 10/08* (2012.01)
 *G06K 7/10* (2006.01)
 *G06K 19/06* (2006.01)

(52) U.S. Cl.
 CPC ..... *G06Q 10/0833* (2013.01); *G06K 7/10722* (2013.01); *G06K 19/06028* (2013.01)

(58) Field of Classification Search
 CPC ........... G06Q 10/0833; G06K 7/10722; G06K 19/06028
 See application file for complete search history.

(56) References Cited

U.S. PATENT DOCUMENTS

| | | | | |
|---|---|---|---|---|
| 5,635,694 A * | 6/1997 | Tuhro | ............... | G06K 1/121 235/375 |
| 6,557,755 B1 * | 5/2003 | Pickering, Jr. | ... | G07B 17/00024 235/376 |
| 7,753,271 B2 * | 7/2010 | Skaaksrud | ............ | G06Q 10/08 235/384 |
| 7,849,411 B1 * | 12/2010 | George | ................ | G06Q 30/06 715/758 |

(Continued)

OTHER PUBLICATIONS

"Section 5.6: Data Matrix Symbology", published by GS 1, Jan. 2006 (Year: 2006).*

(Continued)

*Primary Examiner* — Kevin H Flynn
*Assistant Examiner* — Omar Zeroual
(74) *Attorney, Agent, or Firm* — MH2 Technology Law Group, LLP (57) ABSTRACT

Embodiments relate to systems, devices, and computer-implemented methods for tracking delivery items associated with a postal tracking product that includes a tracking bar code and a serial number. The tracking bar code can be attached to a delivery item and mailed. The delivery item can be processed by a delivery processing system, which can capture an image of the delivery item and the tracking bar code, and can extract a tracking number from the tracking bar code. The delivery processing system can report information on the location of the delivery item using the tracking number, and an indication of the location can be provided to a user that enters the serial number into a tracking interface.

21 Claims, 7 Drawing Sheets

(56) References Cited

U.S. PATENT DOCUMENTS

| | | | | | |
|---|---|---|---|---|---|
| 7,865,408 B2* | 1/2011 | Bhadra | | G06Q 10/08 | 705/22 |
| 7,933,845 B1* | 4/2011 | Leon | | G07B 17/00024 | 705/401 |
| 8,210,430 B1* | 7/2012 | Grant | | G06Q 10/087 | 235/383 |
| 8,651,370 B1* | 2/2014 | Mudrick | | G06Q 30/0239 | 235/375 |
| 8,756,124 B1* | 6/2014 | Sayers, III | | G16H 40/20 | 705/28 |
| 8,768,857 B1* | 7/2014 | Bennett | | G07B 17/00508 | 705/1.1 |
| 8,833,654 B1* | 9/2014 | Grant | | G06Q 10/0833 | 235/383 |
| 9,047,385 B1* | 6/2015 | Malkin | | G06F 16/9554 | |
| 9,552,506 B1* | 1/2017 | Nadabar | | G06K 7/1447 | |
| 9,552,565 B2* | 1/2017 | Minogue | | | |
| 9,978,185 B1* | 5/2018 | Bortnak | | G07B 17/00 | |
| 10,068,262 B1* | 9/2018 | Nidamarthi | | G06Q 30/0282 | |
| 2002/0032573 A1* | 3/2002 | Williams | | G06Q 10/08 | 705/335 |
| 2003/0037008 A1* | 2/2003 | Raju | | G07B 17/00024 | 705/60 |
| 2003/0080182 A1* | 5/2003 | Gunther | | G06Q 10/08 | 235/375 |
| 2004/0153425 A1* | 8/2004 | Dillard | | G06Q 50/06 | 705/410 |
| 2004/0186811 A1* | 9/2004 | Gullo | | G06Q 30/04 | 705/402 |
| 2004/0230543 A1* | 11/2004 | Baker | | G06Q 10/08355 | 705/401 |
| 2005/0009564 A1* | 1/2005 | Hayaashi | | H04W 12/06 | 455/558 |
| 2005/0116047 A1* | 6/2005 | Lu | | G06K 17/00 | 235/487 |
| 2005/0228761 A1* | 10/2005 | Monsen | | G07B 17/00024 | 705/401 |
| 2006/0010086 A1* | 1/2006 | Klein | | G07B 17/00508 | 705/410 |
| 2006/0020505 A1* | 1/2006 | Whitehouse | | G06Q 10/08 | 705/333 |
| 2006/0089921 A1* | 4/2006 | Witmond | | G06Q 10/083 | 705/401 |
| 2006/0122947 A1* | 6/2006 | Poulin | | G07B 17/00362 | 705/401 |
| 2006/0261168 A1* | 11/2006 | Bybell | | G06K 1/121 | 235/462.16 |
| 2007/0074043 A1* | 3/2007 | Lacey | | H04L 9/3226 | 713/186 |
| 2007/0124261 A1* | 5/2007 | Obrea | | G07B 17/00508 | 705/408 |
| 2007/0138270 A1* | 6/2007 | Reblin | | G06Q 20/327 | 235/383 |
| 2007/0143125 A1* | 6/2007 | Foth | | G06Q 10/0834 | 705/334 |
| 2007/0206043 A1* | 9/2007 | Turner | | B41J 2/325 | 347/19 |
| 2007/0255664 A1* | 11/2007 | Blumberg | | B41J 11/009 | 705/408 |
| 2008/0253608 A1* | 10/2008 | Long | | G06K 7/14 | 382/100 |
| 2009/0171861 A1* | 7/2009 | Horree | | G07B 17/00362 | 705/410 |
| 2010/0100436 A1* | 4/2010 | Phifer | | G06Q 10/107 | 705/14.49 |
| 2010/0106290 A1* | 4/2010 | Isles | | B07C 3/20 | 700/227 |
| 2010/0140340 A1* | 6/2010 | Hoffman | | G07B 17/00024 | 235/375 |
| 2010/0155479 A1* | 6/2010 | Ming | | G06K 17/00 | 235/462.1 |
| 2010/0282847 A1* | 11/2010 | Lei | | G06K 7/10712 | 235/438 |
| 2010/0292833 A1* | 11/2010 | Gorp | | G06Q 10/00 | 700/221 |
| 2011/0145107 A1* | 6/2011 | Greco | | G06Q 10/08 | 705/27.2 |
| 2011/0290878 A1* | 12/2011 | Sun | | G06K 7/14 | 235/437 |
| 2011/0290880 A1* | 12/2011 | Cai | | G06K 7/14 | 235/437 |
| 2012/0091203 A1* | 4/2012 | Al-Omari | | G06K 7/14 | 235/435 |
| 2012/0091205 A1* | 4/2012 | Khorsheed | | G06K 7/14 | 235/462.11 |
| 2012/0145779 A1* | 6/2012 | Bietenbeck | | G06K 19/06037 | 235/375 |
| 2012/0193424 A1* | 8/2012 | Al-Omari | | G06K 7/14 | 235/462.1 |
| 2012/0232970 A1* | 9/2012 | Kara | | G07B 17/00024 | 705/14.4 |
| 2012/0325902 A1* | 12/2012 | Goyal | | G06F 17/00 | 235/375 |
| 2013/0024525 A1* | 1/2013 | Brady | | G06F 16/951 | 709/206 |
| 2013/0071029 A1* | 3/2013 | Terwilliger | | H04L 67/36 | 382/183 |
| 2013/0151631 A1* | 6/2013 | Jensen | | H04L 51/18 | 709/206 |
| 2013/0228630 A1* | 9/2013 | Fan | | G06K 19/06103 | 235/494 |
| 2013/0299569 A1* | 11/2013 | Gentile | | G06Q 10/0833 | 235/375 |
| 2013/0323476 A1* | 12/2013 | Farrell | | B29C 65/1609 | 428/195.1 |
| 2014/0115708 A1* | 4/2014 | Terwilliger | | G06F 21/36 | 726/26 |
| 2014/0117076 A1* | 5/2014 | Eberlein | | G06F 16/9566 | 235/375 |
| 2014/0141756 A1* | 5/2014 | Kirner | | G06K 9/18 | 455/414.1 |
| 2014/0149308 A1* | 5/2014 | Ming | | G06Q 10/0833 | 705/333 |
| 2014/0195653 A1* | 7/2014 | Alexander | | H04L 67/10 | 709/219 |
| 2014/0265300 A1* | 9/2014 | Jena | | G06Q 10/083 | 283/67 |
| 2014/0312125 A1* | 10/2014 | Noumura | | G06K 19/06028 | 235/494 |
| 2014/0316991 A1* | 10/2014 | Moshal | | G06Q 20/223 | 705/64 |
| 2014/0337245 A1* | 11/2014 | Bhatt | | G06Q 10/0833 | 705/333 |
| 2014/0367464 A1* | 12/2014 | Herzig | | G06K 1/121 | 235/375 |
| 2015/0041530 A1* | 2/2015 | Burkhart | | G06K 19/06037 | 235/375 |
| 2015/0088740 A1* | 3/2015 | Doyle | | G06Q 40/00 | 705/42 |
| 2015/0129654 A1* | 5/2015 | Janakiraman | | G06Q 10/083 | 235/375 |
| 2015/0199853 A1* | 7/2015 | Bentley | | G06Q 10/08 | 382/101 |
| 2015/0248570 A1* | 9/2015 | Johansen | | G06K 7/10722 | 235/462.05 |
| 2015/0262247 A1* | 9/2015 | Bonello | | G06Q 30/0269 | 705/14.66 |
| 2015/0269188 A1* | 9/2015 | Yang | | G06F 16/50 | 235/375 |
| 2015/0332136 A1* | 11/2015 | Nosaka | | G06K 19/0614 | 235/494 |
| 2016/0019407 A1* | 1/2016 | Yoshida | | G06K 19/06103 | 235/437 |
| 2016/0140570 A1* | 5/2016 | Rivlin | | G06Q 10/08 | 705/317 |
| 2016/0228922 A1* | 8/2016 | Snead | | B07C 7/005 |

(56) References Cited

U.S. PATENT DOCUMENTS

| | | | |
|---|---|---|---|
| 2016/0253732 A1* | 9/2016 | Brown | G06K 7/10722 |
| | | | 235/462.11 |
| 2016/0275639 A1* | 9/2016 | Holub | H04N 1/32 |
| 2016/0323108 A1* | 11/2016 | Bhogal | H04L 63/123 |
| 2016/0330081 A1* | 11/2016 | Zhang | H04L 41/142 |
| 2017/0109772 A1* | 4/2017 | Sundman | G06Q 30/0214 |
| 2017/0132565 A1* | 5/2017 | Beadles | G06K 7/10297 |
| 2017/0154297 A1* | 6/2017 | Chenu | G06Q 10/06311 |
| 2017/0213064 A1* | 7/2017 | Ackley | G06K 7/1473 |
| 2017/0324729 A1* | 11/2017 | Hon | H04W 12/06 |
| 2017/0372260 A1* | 12/2017 | Desmarais | B67D 3/00 |
| 2018/0268348 A1* | 9/2018 | Guan | G06Q 10/08 |

OTHER PUBLICATIONS

"GS1 Data Matrix: An introduction and technical overview of the most advanced GS1 Application Identifiers compliant symbology", published by GS1, 2011 (Year: 2011).*

"USPS barcode, package, Intelligent Mail", published by USPS, Dec. 29, 2011 (Year: 2011).*

Bleumer, "Electronic Postage Systems: Technology, Security, Economics", published by Springer, in 2007, all pages (Year: 2007).*

\* cited by examiner

TRACKABLE POSTAGE

CROSS-REFERENCE TO RELATED APPLICATIONS

This application claims priority to U.S. Provisional Patent Application Ser. No. 62/222,032, which was filed on Sep. 22, 2015 and is incorporated herein by reference in its entirety.

BACKGROUND

Various agencies and companies provide delivery services using delivery processing systems, such as the U.S. Postal Service's mail delivery processing system, or the delivery processing systems of the Federal Express corporation (FedEx™) or the United Parcel Service corporation (UPS™). A delivery processing system can include one or more devices at one or more locations that process delivery items at that location by, for example, scanning the delivery items, authenticating postage, determining destination addresses, sorting the delivery items, etc. As an example, a delivery item can be mailed from a first location where it is initially processed by the delivery processing system (e.g., a sorter), causing it to be sent to a second location where it is again processed by the delivery processing system (e.g., another sorter), before being delivered to a destination (e.g., a home or business).

While delivery service using such systems may be generally reliable, it is often difficult for a customer of a delivery service to determine when a delivery item will arrive at its destination. Accordingly, there is a desire for postal tracking products and methods, systems, and computer-readable media that track delivery items, for example, at delivery processing centers, while in transit, when near a delivery location, etc., thereby allowing the customer to determine a current location and/or an arrival time of a delivery item with increased accuracy.

SUMMARY

In accordance with aspects of the present disclosure, computer-implemented methods, systems, and computer-readable media are disclosed for tracking delivery items associated with a postal tracking product that includes a tracking bar code and a serial number. The tracking bar code can be attached to a delivery item and mailed. The delivery item can be processed by a delivery processing system, the delivery processing system can capture an image of the delivery item and the tracking bar code, and a tracking number can be extracted from the tracking bar code. The delivery processing system can report information on the location of the delivery item using the tracking number, and an indication of the location can be provided to a user that enters the serial number into a tracking interface.

DESCRIPTION OF DRAWINGS

The accompanying drawings, which are incorporated in and constitute a part of this specification, illustrate embodiments of the present teachings and together with the description, serve to explain the principles of the present teachings. In the drawings.

DETAILED DESCRIPTION

Reference will now be made in detail to the present examples of embodiments of the disclosure, several examples of which are illustrated in the accompanying drawings.

Various embodiments include systems, methods, and manufactures that track delivery items using tracking bar codes, where postage refers to an indicia or tangible representation of a payment, charge, monetary amount, or cost for delivery. Various embodiments additionally include systems, methods, and manufactures that provide trackable postage using tracking bar codes and serial bar codes. A tracking bar code encodes, contains, or otherwise includes information that is used to track a delivery item through a mail processing or delivery system, and a serial bar code encodes, contains, or otherwise includes information that represents a serial number, which may be a unique serial number that can be used by a user to access tracking information. In some embodiments, the bar codes can be linear bar codes (i.e., one-dimensional bar codes) or Quick Response Codes ("QR codes") (i.e., two-dimensional bar codes), or the like. In further embodiments, the serial number and the tracking number can be the same number or one number can be based on (e.g., derived or calculated from or using) the other number.

In other embodiments, a unique identifier (e.g., an alphanumeric string, a unique symbol, etc.) can be used in place of a bar code with the systems, methods and manufactures described herein. In such embodiments, the unique identifier can be machine scannable and can be processed similar to a bar code, as described herein.

Trackable postage enables users to follow (e.g. obtain location information for) delivery items, such as greeting cards, postcards, packages, parcels, and personal and business letters and the like, as they travel through a delivery processing system, such as the U.S. Postal Service's mail delivery processing system, or the delivery processing systems of the Federal Express corporation (FedEx™) or the United Parcel Service corporation (UPS™).

In some embodiments, in order to utilize trackable postage, a user can purchase a postal tracking product that includes a postage stamp and a tracking bar code, for example, either on separate stickers that are dispensed as a single product or with the tracking bar code included as part of the postage stamp itself. In further embodiments, the postal tracking product can include a serial number, for example, encoded in a serial bar code that is dispensed with the postage stamp and the tracking bar code as a single product.

A postage stamp, as referred to herein, is an item that can be attached and displayed on a delivery item as proof of payment of postage, such as, for example, a small printed piece of paper with adhesive on one side.

As referred to herein, a tracking bar code is a computer-readable bar code encoding or otherwise associated with a tracking number. Each tracking number may be, and is preferably, unique with respect to other tracking numbers and, in various embodiments, can be generated randomly, sequentially, etc. In various embodiments, a tracking number may be a series or sequence of characters, which may include numbers, letters, or a combination of numbers and letters, or the like. The tracking bar code can be attached to a delivery item and its image captured via cameras in a delivery processing system. The tracking number may be extracted by processing the captured image of the tracking bar code. The tracking bar code can be used by a delivery processing system to identify locations, activities, and/or statuses associated with the mail item to which the tracking bar code is attached, based on the location and other information associated with the image-capturing camera, and to report the locations, activities, and/or statuses to a user.

In some embodiments, the tracking bar code can be separate from the postage payment indicator (e.g., postage stamp), and both the tracking bar code and the postage payment indicator can be attached to a delivery item separately. In further embodiments, the tracking bar code can be included as part of, integrated with, and/or cover substantially the entire postage payment indicator (e.g., postage stamp). For example, the tracking code can be a separate image adjacent to a decorative image, the tracking code can be integrated as part of the decorative image, or the tracking code can replace a traditional decorative image on a postage stamp.

As an example of the tracking code integrated as part of a decorative image, the tracking code can be inserted into the decorative image and/or be included as part of the decorative image. For example, a decorative image of a flower can include the tracking code within the design of the flower.

As referred to herein, a serial number is a series or sequence of characters, which may include numbers, letters, or a combination of numbers and letters, that is provided to and/or used by a user of trackable postage to access tracking information. Each serial number may be, and is preferably, unique with respect to other serial numbers and, in various embodiments, can be generated randomly, sequentially, etc. The serial number can be associated with one or more tracking numbers. In some embodiments, the serial number and the tracking number can be the same number or similar numbers, one number can be based on the other (e.g., derived or calculated from or using the other number), the serial number can be included in the tracking number, or the tracking number can be included in the serial number, etc. For example, a booklet or sheet of postage stamps may include a tracking number for each postage stamp and a single serial number for the entire booklet. As a further example, a booklet or sheet of postage stamps may include a tracking number and a serial number for each postage stamp (e.g., a sheet of ten stamps includes ten tracking numbers and ten serial numbers). As also referred to herein, a serial bar code is a computer-readable bar code associated with (e.g., that encodes) the serial number and that can be captured as an image via cameras, such that the serial number can be extracted by processing the captured image of the serial bar code. For example, a user can capture an image of the serial bar code with a mobile device running an application that can process the bar code and extract information encoded in the bar code.

In further embodiments, the serial bar code can additionally encode, for example, a domain name and/or the Internet Protocol (IP) address of a website associated with an Internet-based postage tracking interface, as described in further detail below. In an example embodiment, the serial bar code can be scanned by a user device (e.g., using a camera of a smart phone). The user device can be configured to process scanned bar codes, automatically navigate to websites based on the encoded domain names (e.g., my.usps.com/tracking) and/or the IP addresses, and/or automatically enter the serial numbers extracted from the bar codes into the postage tracking interface. Accordingly, after scanning the serial bar code, the user device can automatically display a web page with postage tracking information. In various embodiments, this functionality may be implemented by an application downloaded and executed by the user device.

In some embodiments, users can purchase postage payment indicators (e.g., postage stamps) that include both a tracking number and a serial number on the face of each indicator. In further embodiments, the serial number can be separate from the purchased postage payment indicators, but included with the purchase. For example, a booklet of postage stamps can be purchased and the serial numbers for each postage stamp can be in the booklet, but not printed or otherwise shown on the face of any of the postage stamps.

Figure 1:
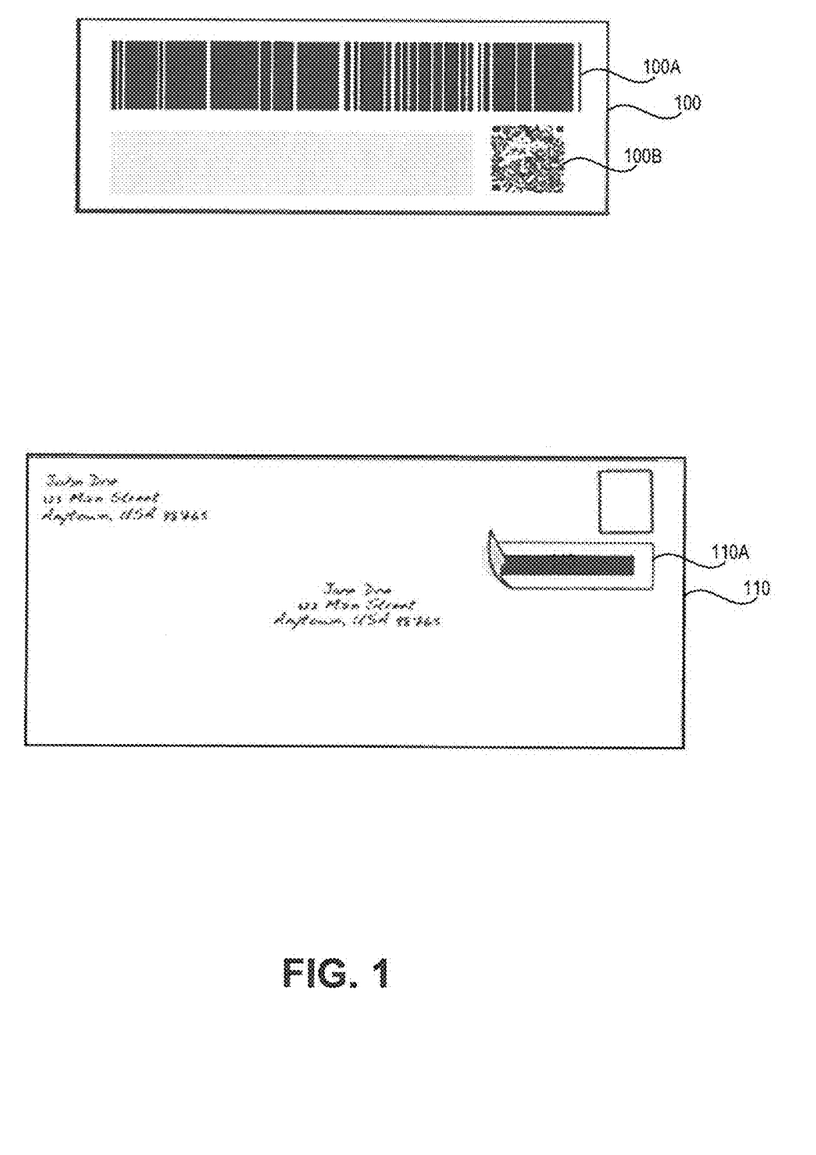
FIG. 1 is a diagram illustrating examples of tracking and serial bar codes, consistent with an embodiment of the invention.

FIG. 1 is a diagram illustrating examples of tracking and serial bar codes, consistent with an embodiment of the invention. As shown in FIG. 1, an item 100 can include a linear bar code 100A and a QR code 100B. In some embodiments, the item 100 can be an item that can be individually purchased at a store, an item included in a postage stamp booklet that can be purchased at a store, an item that can be printed out by a user after an online purchase, etc. In some implementations, the linear bar code 100A can be a tracking bar code associated with a tracking number and the QR code 100B can be a serial bar code associated with a serial number. As described above, in various implementations, the serial number and the tracking number can be the same number, can be different numbers, one number can be based on the other number, etc. In some implementations, the item 100 may be in the form of a self-adhesive sticker or other printed paper item of a size that can be adhered or otherwise attached to a delivery item, such as an envelope, package, periodical, box, or the like.

In some embodiments, the item 100 can be purchased separately from one or more postage payment indicators (e.g., postage stamps), while, in further embodiments, the item 100 can be included with a purchase of one or more postage payment indicators. In some implementations, all or part of the item 100 can be attached to a delivery item (e.g. by a user). For example, as shown on the item 110, the linear bar code 110A can be a tracking bar code and can be attached to the item 110. In some embodiments, the linear bar code 110A can be a removable segment of the item 100 that includes the linear bar code 100A, and the removable segment can include pressure-sensitive adhesive on the side opposite the linear bar code 100A. The removable segment with the linear bar code 110A can be attached to the item 110 by pressing the adhesive side against the item 110.

Figure 2:
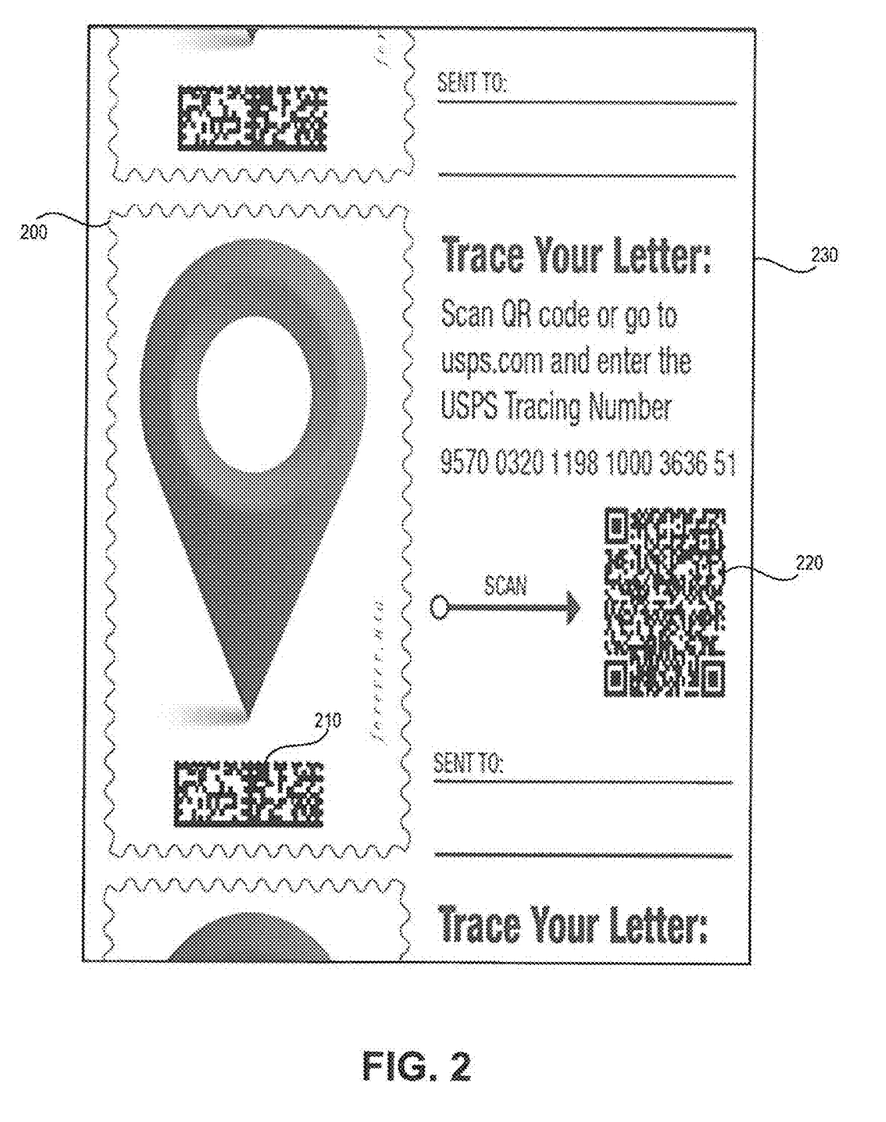
FIG. 2 is a diagram illustrating an example element of a stamp booklet that includes a serial bar code and a postage stamp with a tracking bar code, consistent with an embodiment of the invention.

FIG. 2 is a diagram illustrating an example element (e.g., a page) of a postage stamp booklet 230 that includes a serial bar code 220 and a postage stamp 200 with a tracking bar code 210, consistent with an embodiment of the invention. As shown in FIG. 2, the postage stamp 200 can be included in the postage stamp booklet 230. The postage stamp booklet 230 can include multiple postage stamps and one or more serial bar codes (e.g. the serial bar code 220). The serial bar code 220 can be, for example, a QR code as shown in this example. In some embodiments, the serial bar code 220 can be an encoded version of a serial number.

As shown, the postage stamp 200 can include the tracking bar code 210. The tracking bar code 210 can be, for example, a QR code as shown in this example. In some embodiments, the tracking bar code 210 can be an encoded version of a tracking number, which can be the same as the serial number or can be a different number.

The postage stamp 200, which includes the tracking bar code 210, can, in some embodiments, be removable from the stamp booklet 230 and can include pressure-sensitive adhesive on the side opposite the decorative image and the tracking bar code 210. Accordingly, the postage stamp 200 and the tracking bar code 210 can be attached to a delivery item.

In various embodiments, the tracking bar code 210 can be photographed, scanned, or otherwise captured in an image, the captured image can be analyzed, and the encoded tracking number extracted. For example, the cameras and computing devices that are part of a delivery processing system (e.g., in sorting machines) may capture and analyze the tracking bar code 210 when the delivery item is sorted or otherwise processed at various locations ranging from where the delivery item was originally shipped (e.g., mailed) and the destination address of the delivery item. Cameras and computing devices in the delivery processing system may be required to process relatively large numbers of tracking bar codes (e.g. hundreds or thousands of tracking bar codes) in relatively small amounts of time (e.g. in a matter of seconds or minutes). Accordingly, in various embodiments, various features of the tracking bar codes may be optimized to promote efficient and accurate scanning and processing. The various features described herein are merely for the sake of example and are not intended to be limiting. For example, the spectral ranges described herein are in the visible light range, but such implementations are not intended to be limiting and other spectral ranges can be used that include, for example, infrared and ultraviolet light for "invisible" bar codes (i.e., bar codes that are not human-readable). Variations of the described features can be used and/or different features can be altered, consistent with certain disclosed embodiments.

In some embodiments, for fast, efficient, and accurate scanning and processing, the tracking bar codes may be required to have a height of at least $1/4^{th}$ of an inch and an overall symbol grade of "A" measured with a ten millimeter aperture in the red spectral range between 630 nanometers and 675 nanometers. The symbol grade of "A" can be based upon the International Organization for Standardization (ISO) and International Electrotechnical Commission (IEC) standards provided in ISO/IEC 15416:2000, published on Aug. 15, 2000.

Additionally, in further embodiments, the tracking bar codes may be required to use a specific symbology, such as a Data Matrix 2-D bar code that employs ECC200 error correction, and may require the bar code to store a minimum amount of data (e.g. twenty bytes). In some embodiments, a 12 module by 36 module (12×36) data matrix using the ECC200 error correction code can be used. The ECC200 error correction code allows for Reed-Solomon error correction and twenty bytes of data over two 10×16 data regions in the 12×36 data matrix that can be used for 22 data blocks, 18 error code-word blocks, and one interleaved block.

As an example, the 22 data blocks in the 12×36 data matrix can be used to store a tracking number that includes the following information: a two-digit Retail Channel Application Identifier; a three-digit Service Type Code (e.g., a code representing a first class letter); a single-digit channel identifier (e.g., an identifier representing a pre-printed channel); a six-digit mailer identifier ("MID"); a nine-digit tracking number (e.g., the same number as the serial number encoded in serial bar code 220); and a single-digit modulus 10 check digit. As used herein, the term "digit" is broadly used to refer to numeric characters (e.g., 0, 1, 2, etc.), alphabetic characters (e.g., A, a, b, C, etc.) and/or symbolic characters (e.g., !, @, $, etc.) and the like.

As further examples, additional features that can be used or required for tracking bar codes can include data matrix codes that support ASCII encodation and/or multiple encodation methods, minimal clear/quiet zones around the perimeter of the data matrix (e.g., four modules around the data matrix where no text, images, or other markers should appear), minimum/maximum reflectance value, and/or symbol contrast.

The minimum/maximum reflectance value can represent a ratio between a reflectance value of the darkest module within a bar code (Rdark) and the reflectance value of the lightest module within the bar code (Rlight). For example, the minimum/maximum reflectance value can be measured in the red spectral range between 630 nanometers and 675 nanometers, and Rdark can be required to be equal to or less than half of Rlight (Rdark≤(0.5)Rlight).

The symbol contrast (SC) can represent the difference between the highest reflectance value (Rmax) and the lowest reflectance value (Rmin) within the bar code, including quiet zones. For example, the symbol contrast can be required to be greater than 40 percent (SC=Rmax−Rmin; SC≥40%) to ensure sufficient readability of the bar code. In some embodiments, a symbol contrast less than 40 percent (e.g., 20%) could result in lower readability and, thus, an increased likelihood of mistakes and/or more time required to scan the bar code.

FIG. 2 sets forth examples using postal stamps and postal systems. However, the examples are not intended to be limiting and the processes, specifications, and examples described above can be implemented using other types of delivery systems and environments and using any form of postage that provides a representation of payment, charge, monetary amount, or cost for delivery. For example, the processes described above can be implemented using delivery processing systems of the Federal Express corporation (FedEx™) or the United Parcel Service corporation (UPS™).

Figure 3:
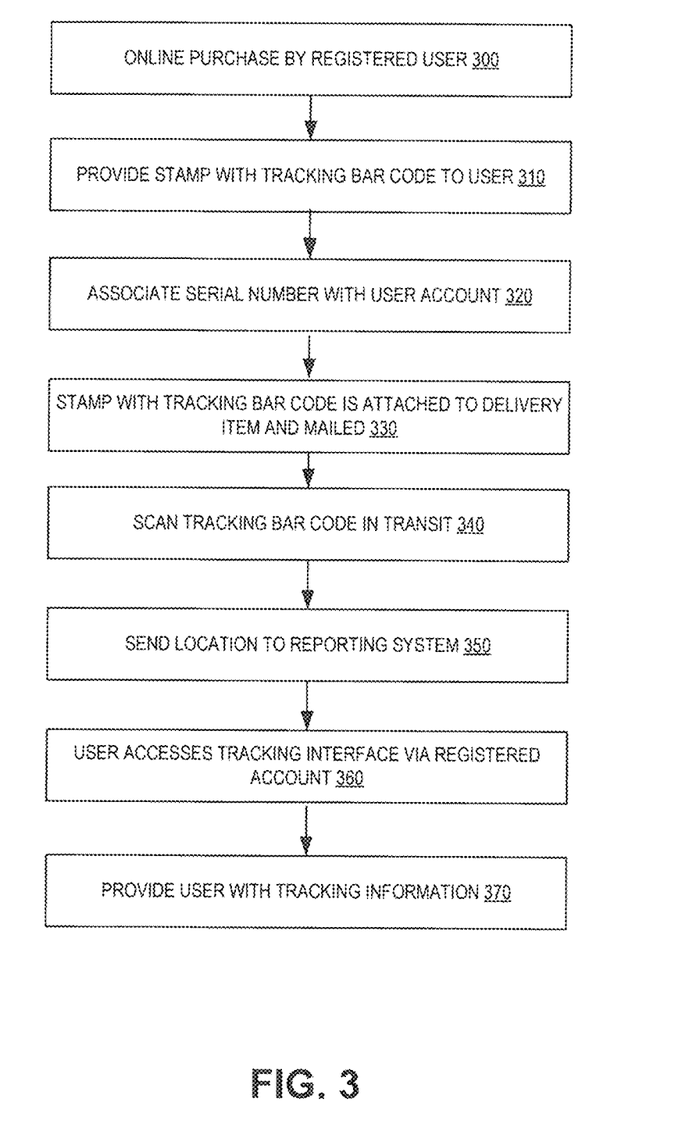
FIG. 3 is a flow diagram illustrating an example of a method of online purchasing and utilization of trackable postage by a registered user, consistent with an embodiment of the invention.

FIG. 3 is a flow diagram illustrating an example of a method of online purchasing and utilization of trackable postage by a registered user, consistent with an embodiment of the invention. The process can begin in 300 when a registered user purchases a postage tracking product online via a website. As used herein, a postage tracking product can be a tracking number (e.g., encoded in a standalone printable tracking bar code) or a postage stamp with a tracking number (e.g., a printable stamp that includes a tracking bar code).

In the embodiments discussed with regard to FIG. 3, the user can be a registered user. For example, the user can be registered with a website that provides the interface for purchasing the postage tracking product and/or trackable postage. The registered user can log in with, for example, a previously set-up account that stores information about the registered user, such as name, address, a credit card number for billing, a username, a password, and the like, and all purchases while the registered user is logged in can be associated with the user's account with the website.

In 310, the website can provide the registered user with the postage tracking product, which can include, for example, a postage stamp and a tracking bar code corresponding to (e.g., encoded with) a tracking number. In some embodiments, the postage tracking product can be provided as a printable document accessible via the website after purchase (e.g., a portable document format ["PDF"] file or a printable hypertext transfer protocol ["HTTP"] page). The printable document can include a representation of the postage stamp (e.g. a decorative image) and the tracking bar code as part of the postage stamp.

In 320, the website can associate a serial number with the user's account. In various embodiments, the serial number may be stored in a database or data structure such that it indexed to, locatable using, retrievable via, or otherwise associated with the user's account. In some embodiments, the tracking number encoded in the tracking bar code can be the same as or include the serial number. Accordingly, whenever the tracking bar code is photographed, scanned or captured and processed, for example, by a sorting machine or an application on a smart phone, the tracking number and the serial number can be identified.

In 330, the registered user can attach the tracking bar code and/or the postage stamp to a delivery item and can mail the delivery item.

In 340, on route to its final destination, the delivery item can be scanned, the tracking bar code can be identified, the tracking bar code can be processed, and the tracking number can be extracted. In some embodiments, the delivery item can be scanned by an Intelligent Mail Visibility ("IM VIS") system at, for example, the location where the registered user initially mailed the delivery item (e.g., a local post office), at an intermediate processing location, prior to final delivery (e.g., a post office local to the destination address), etc. The IM VIS system can capture images of delivery items that pass through the system, perform optical character recognition ("OCR") on the name and address printed on the delivery items for routing and delivery purposes, and also recognize the tracking bar code and report time, date, and location information in association with the tracking number from the tracking bar code.

In some implementations, prior to being scanned by the IM VIS system, the delivery item can pass through an Advanced Facer-Canceler System ("AFCS"). The AFCS is a high-speed machine that culls, properly orients, and cancels postage stamps. Accordingly, the delivery item can be properly oriented for OCR and the postage stamp canceled prior to passing through the IM VIS system.

In further implementations, after passing through the AFCS, the delivery item can pass through a Mail Handling Tracking System ("MHTS") that monitors the volume of mail passing through the MHTS.

In some embodiments, delivery time and date information can be estimated and reported using an Implied Visibility ("IV") system. An IV system can use a global positioning system ("GPS") and geo-fencing data from mail carriers or delivery persons delivering the delivery item to estimate delivery times and dates.

In 350, volume information from the MHTS and time, date, and location and delivery estimation information from the IM VIS system and IV system can be sent to a Product Tracking and Reporting ("PTR") system. The PTR can maintain and/or transmit information from the other systems to the website for reporting to the registered user.

In 360, the registered user can access a tracking interface of the website while logged into the user's account. Accordingly, the tracking interface can automatically determine any serial number(s) associated with the user's account.

In 370, the website can provide the registered user with tracking information related to the delivery item by populating the tracking interface with information on any delivery items (including the delivery item from 330) associated with the serial numbers associated with the user's account. The information that is provided can include, but is not limited to: information describing the location of the delivery item at specified times and dates; information describing the status of the delivery item at specified times and dates; information describing features and/or services associated with the delivery item, information describing estimated delivery times and dates, and the tracking number.

Figure 4:
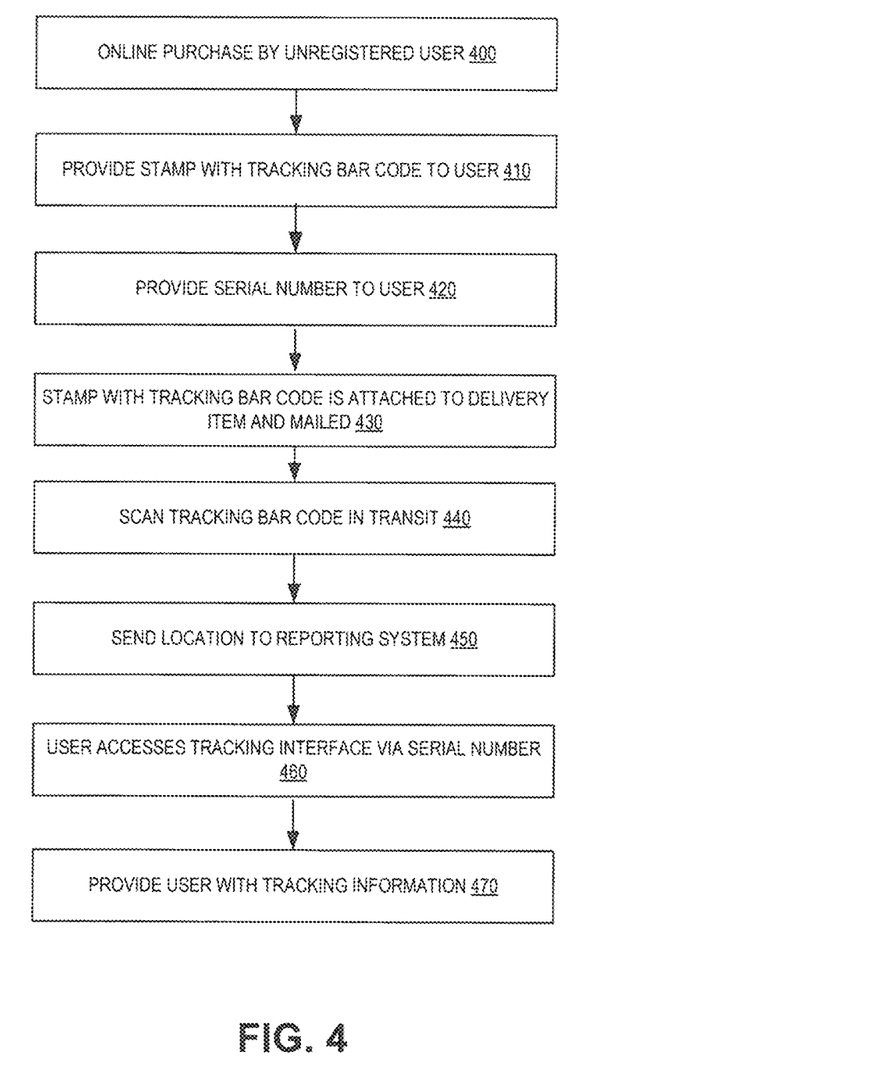
FIG. 4 is a flow diagram illustrating an example of a method of online purchasing and utilization of trackable postage by an unregistered user, consistent with an embodiment of the invention.

FIG. 4 is a flow diagram illustrating an example of a method of online purchasing and utilization of trackable postage by an unregistered user, consistent with an embodiment of the invention. The process can begin in 400 when a user purchases a postage tracking product online via a website. The postage tracking product can be a tracking number or a postage stamp with a tracking number.

In the embodiments discussed with regard to FIG. 4, the user can be an unregistered user. For example, the user may not have set up or previously logged in to a user account with the website and/or may not be currently logged into the website.

In 410, the website can provide the unregistered user with the postage tracking product, which can include, for example, a postage stamp and a tracking bar code corresponding to (e.g., encoded with) a tracking number. In some embodiments, the postage tracking product can be provided as a printable document accessible via the website after purchase (e.g., a PDF file or a printable HTTP page). The printable document can include a representation of the postage stamp (e.g. a decorative image) and/or the tracking bar code as part of the postage stamp.

In 420, the website can provide a serial number to the unregistered user. In some implementations, the serial number can be provided to the unregistered user as a serial bar code that includes the serial number. In additional implementations, the serial number or serial bar code can be included with the printable document provided to the unregistered user. In further implementations, the serial number or serial bar code can be provided separate from the printable document (e.g. on a confirmation page or other web browser display).

In some embodiments, the tracking number encoded in the tracking bar code can be the same as or include the serial number. Accordingly, whenever the tracking bar code is photographed, scanned or captured and processed, for example, by a sorting machine or an application on a smart phone, the tracking number and the serial number can be identified.

In 430, the unregistered user can attach the tracking bar code and/or the postage stamp to a delivery item and can mail the delivery item.

In 440, on route to its final destination, the delivery item can be scanned, the tracking bar code can be identified, the tracking bar code can be processed, and the tracking number can be extracted. In some embodiments, the delivery item can be scanned by an IM VIS system at, for example, the location where the unregistered user initially mailed the delivery item (e.g., a local post office), at an intermediate processing location, prior to delivery (e.g., a post office local to the destination address), etc. The IM VIS system can capture images of delivery items that pass through the system, perform OCR on the name and address printed on the delivery items for routing and delivery purposes, and also recognize the tracking bar code and report time, date, and location information in association with the tracking number from the tracking bar code.

In some implementations, prior to being scanned by the IM VIS system, the delivery item can pass through an AFCS. Accordingly, the delivery item can be properly oriented for OCR and the postage stamp canceled prior to passing through the IM VIS system.

In further implementations, after passing through the AFCS, the delivery item can pass through a MHTS that monitors the volume of mail passing through the MHTS.

In some embodiments, delivery time and date information can be estimated and reported using an IV system. An IV system can use GPS and geo-fencing data from mail carriers or delivery persons delivering the delivery item to estimate delivery times and dates.

In 450, volume information from the MHTS and time, date, and location and delivery estimation information from the IM VIS system and IV system can be sent to a PTR system. The PTR can maintain and/or transmit information from the other systems to the website for reporting to the unregistered user.

In 460, the unregistered user can access a tracking interface of the website (e.g. a webpage interface accessible via a personal computer or a mobile device). In some embodiments, the unregistered user can use the website to find and see tracking information for the delivery item by manually entering the serial number into the tracking interface. However, serial numbers may be difficult to remember and mistakes can be made in either recording the serial number or entering the serial number into the interface. Accordingly, in some embodiments, the unregistered user can enter the serial number into the tracking interface by scanning the serial bar code that the unregistered user obtained (e.g., printed out) at 420 with, for example, a camera of a mobile device, such as a smart phone or tablet computer. The mobile device can include an application that is configured to process bar codes and display the serial number contained therein, which the unregistered user can type in, and/or an application that is associated with or obtained via the website, and that can process the serial bar code, navigate the user to the tracking interface (e.g., via a browser application), and/or automatically enter the serial number into the tracking interface.

In 470, the website can provide the unregistered user with tracking information related to the delivery item by populating the tracking interface with information on any delivery items (including the delivery item from 430) associated with the serial number entered in 460. The information that is provided can include, but is not limited to: information describing the location of the delivery item at specified times and dates; information describing the status of the delivery item at specified times and dates; information describing features and/or services associated with the delivery item, information describing estimated delivery times, and the tracking number.

Figure 5:
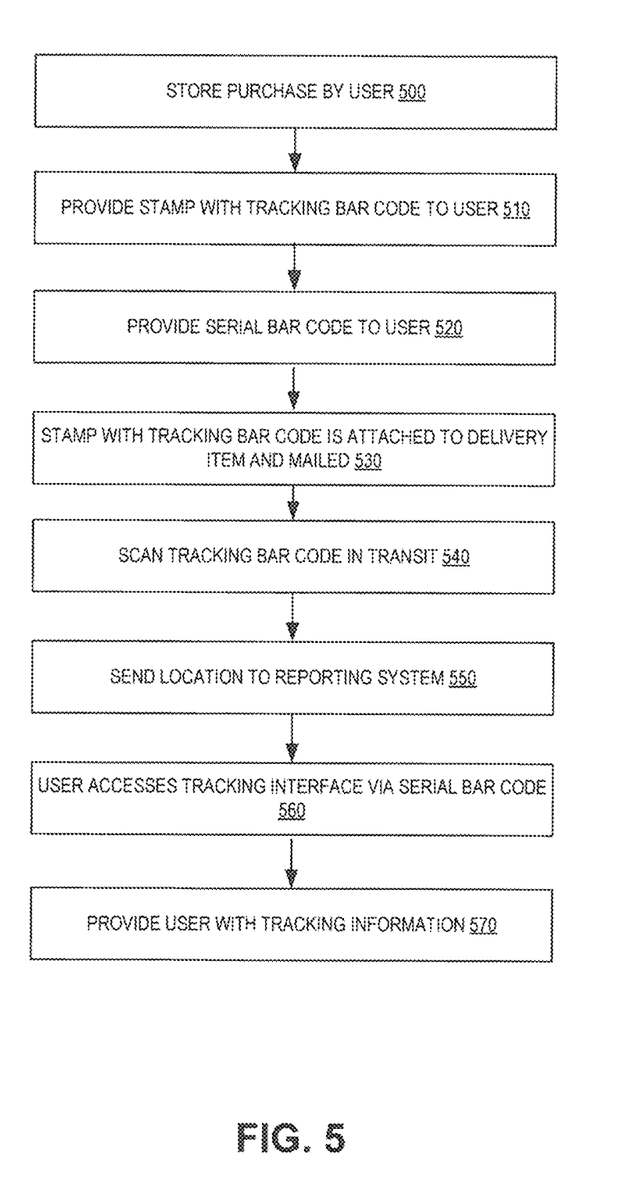
FIG. 5 is a flow diagram illustrating an example of a method of in-store purchasing and utilization of trackable postage, consistent with an embodiment of the invention.

FIG. 5 is a flow diagram illustrating an example of a method of in-store purchasing and utilization of trackable postage, consistent with an embodiment of the invention. The process can begin in 500 when a user purchases a postage tracking product at a store (e.g. a postal store). The postage tracking product can be a tracking number or a postage stamp with a tracking number. In some embodiments, the postage tracking product can be provided by an entity that operates the postal store (e.g. a postal service) or a third-party entity that provides postage tracking products for retail sale. In embodiments where a third-party provides the postage tracking products, the third-party can also provide a file, such as a computer file, to the postal service that identifies tracking numbers and serial numbers associated with the tracking numbers (if different). In some embodiments, the file can be in a proprietary format of the postal service, the file can be uploaded by the postal service to the mail processing service, and the associations between tracking numbers and serial numbers (if different) can be stored in, for example, a central database, allowing the postage tracking products to be tracked by the delivery processing system.

In 510, the user can be provided with the postage tracking product, which can include, for example, a postage stamp and a tracking bar code corresponding to (e.g., encoded with) a tracking number. In some embodiments, the postage tracking product can be provided as a booklet of multiple stamps and/or multiple tracking bar codes.

In 520, the user can be provided with a serial number and/or serial bar code, for example, as part of the postage tracking product. In some embodiments, the tracking number encoded in the tracking bar code can be the same as or include the serial number. Accordingly, whenever the tracking bar code is scanned and processed, the serial number and the tracking number can be identified.

In 530, the tracking bar code and/or the postage stamp can be attached to a delivery item, and the delivery item can be mailed.

In 540, on route to its final destination, the delivery item can be scanned, the tracking bar code can be identified, the tracking bar code can be processed, and the tracking number can be extracted. In some embodiments, the delivery item can be scanned by an IM VIS system at, for example, the location where the user initially mailed the delivery item (e.g., a local post office), at an intermediate processing location, prior to final delivery (e.g., a post office local to the destination address), etc. The IM VIS system can capture images of delivery items that pass through the system, perform OCR on the name and address printed on the delivery items for routing and delivery purposes, and also recognize the tracking bar code and report time, date, and location information in association with the tracking number from the tracking bar code.

In some implementations, prior to being scanned by the IM VIS system, the delivery item can pass through an AFCS. Accordingly, the delivery item can be properly oriented for OCR and the postage stamp canceled prior to passing through the IM VIS system.

In further implementations, after passing through the AFCS, the delivery item can pass through an MHTS that the monitors volume of mail passing through the MHTS.

In some embodiments, delivery time and date information can be estimated and reported using an IV system. An IV system can use GPS and geo-fencing data from mail carriers delivering the delivery item to estimate delivery times and dates.

In 550, volume information from the MHTS and time, date, and location and delivery estimation information from the IM VIS system and IV system can be sent to a PTR system. The PTR can maintain and/or transmit information from the other systems to a website for reporting to the user.

In 560, the user can access a tracking interface of the website (e.g. a webpage interface accessible via a personal computer or a mobile device). In some embodiments, the user can use the website to find and see tracking information for the delivery item by manually entering the serial number into the tracking interface. In other embodiments, the user can enter the serial number into the tracking interface by scanning the serial bar code that the user obtained at 520 with, for example, a camera of a mobile device, such as a smart phone or tablet computer. The mobile device can include an application that is configured to process bar codes and display the serial number contained therein, which the user can type in, and/or an application that is associated with or obtained via the website, and that can process the serial bar code, navigate the user to the tracking interface (e.g., via a browser application), and automatically enter the serial number into the tracking interface.

In 570, the website can provide the user with tracking information related to the delivery item by populating the tracking interface with information on any delivery items (including the delivery item from 530) associated with the serial number entered in 560. The information that is provided can include, but is not limited to: information describing the location of the delivery item at specified times and dates; information describing the status of the delivery item at specified times and dates; information describing features and/or services associated with the delivery item, information describing estimated delivery times and dates, and the tracking number.

FIGS. 3-5 set forth examples using postal stamps and postal systems. However, the examples are not intended to be limiting and the processes and examples described above can be implemented using other types of delivery systems and environments and using any form of postage that provides a representation of payment, charge, monetary amount, or cost for delivery. For example, the processes described above can be implemented using delivery processing systems of the Federal Express corporation (FedEx™) or the United Parcel Service corporation (UPS™).

Figure 6:
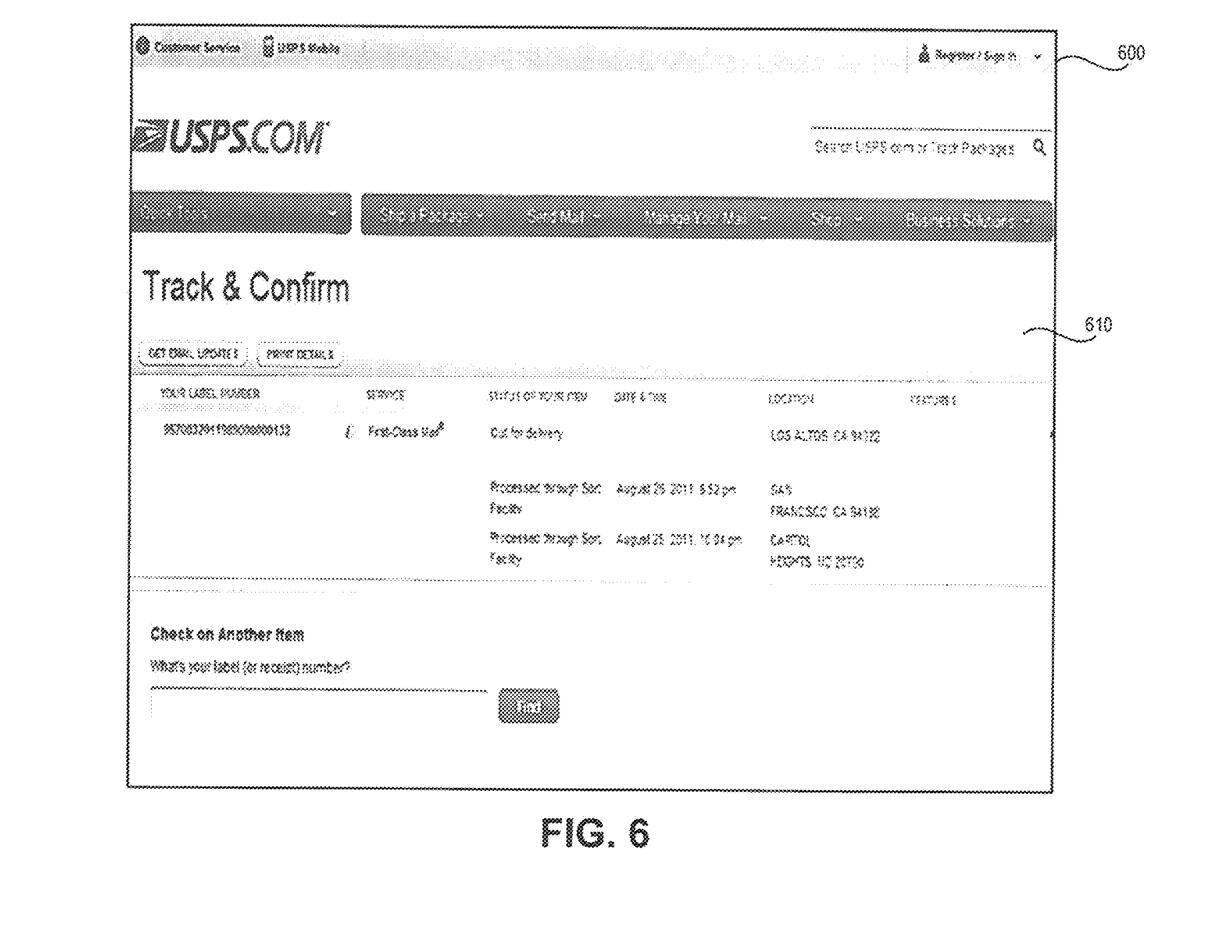
FIG. 6 is a diagram illustrating an example of an Internet-based postage tracking interface, consistent with an embodiment of the invention.

FIG. 6 is a diagram illustrating an example of an Internet-based delivery tracking interface for a trackable postage product, consistent with an embodiment of the invention. A webpage 600 can represent a tracking interface of a website, as described above.

In particular, the webpage 600 can be a tracking interface that receives one or more serial numbers and provides tracking information associated with the one or more serial numbers. For example, tracking information can be provided in a webpage section 610 of the webpage 600. The tracking information can include, but is not limited to: location information at specified times and dates; status information at specified times and dates; features and/or services associated with the delivery item, estimated delivery times and dates, and the tracking number.

The webpage 600 can be accessible to a user via a personal computer or a mobile device. In some embodiments, the user can enter the serial number manually into the webpage 600 or, in further embodiments, the serial number can be entered automatically by an application (e.g. a mail tracking application on the user's mobile device) by photographing, scanning, or otherwise capturing and interpreting a serial bar code. In still further embodiments, the webpage 600 can be integrated with and/or viewable through a mail tracking application on the user's mobile device, the mail tracking application can automatically navigate the user's mobile device (e.g., via a browser application) to the webpage 600 based on a domain name or IP address embedded in the serial bar code, and/or the mail tracking application can automatically enter the serial number into the tracking interface.

FIG. 6 sets forth examples using postal stamps and postal systems. However, the examples are not intended to be limiting and the processes and examples described above can be implemented using other types of delivery systems and environments and using any form of postage that provides a representation of payment, charge, monetary amount, or cost for delivery. For example, the processes described above can be implemented using delivery processing systems of the Federal Express corporation (FedEx™) or the United Parcel Service corporation (UPS™).

Figure 7:
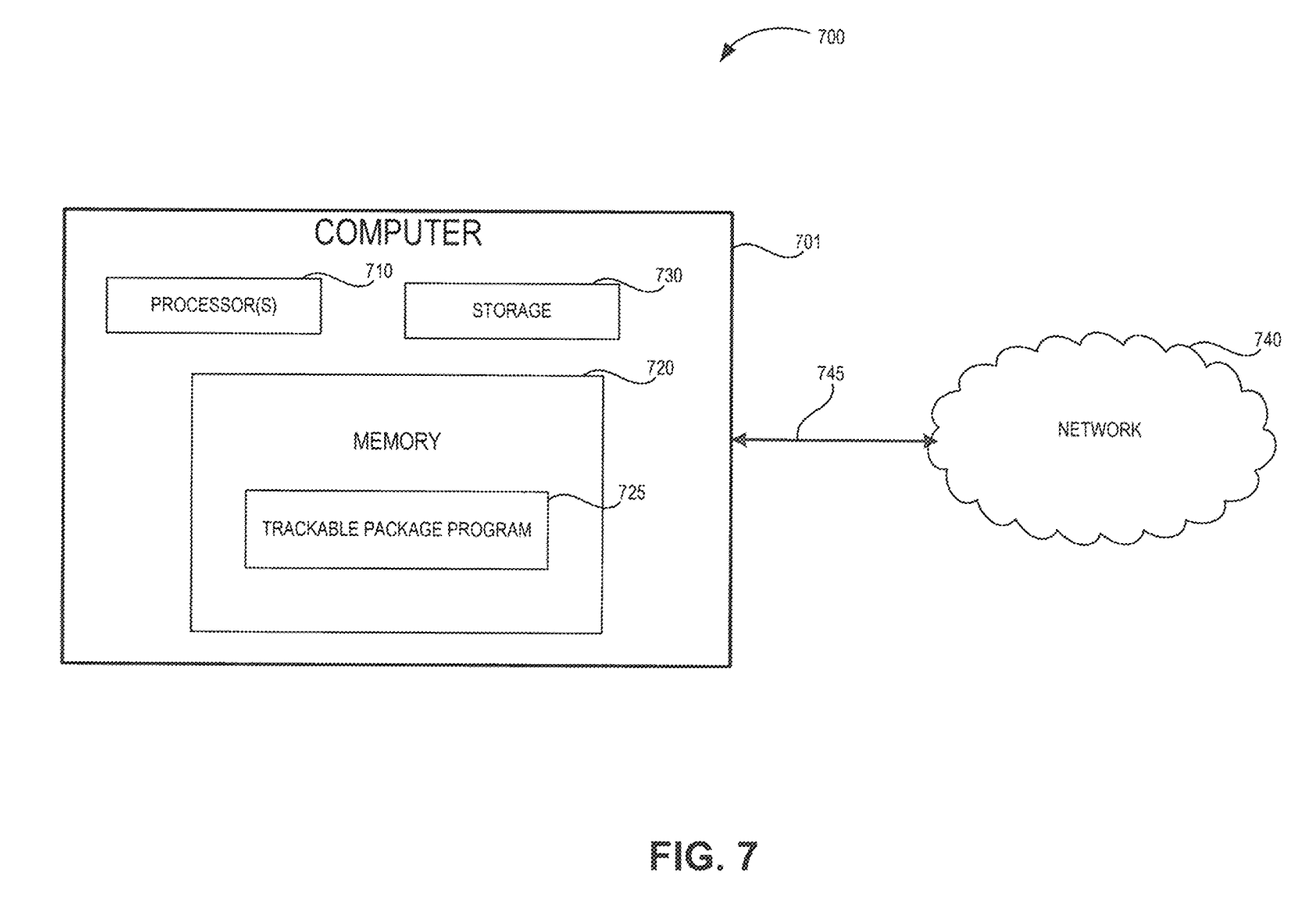
FIG. 7 is a diagram illustrating an example of a computing system for tracking delivery items, consistent with certain disclosed embodiments.

FIG. 7 is a diagram illustrating an example of a computing system for tracking delivery items, consistent with certain disclosed embodiments. In some embodiments, the computing system can represent a personal computer of a user or a mobile device of a user. In further embodiments, the computing system can represent, for example, a specialized computer system configured to be a server for hosting the tracking webpage and/or the associated website, a specialized computer system of an administrator of the website, a specialized mail processing computer system, etc.

A computer system 700 can include a computer 701 that may include a processor 710, a memory 720, a storage 730, and input/output (I/O) devices (not pictured). The computer 701 may be implemented in various ways. For example, the computer 701 may be a general purpose computer, a server or other type of a specialized computer, or any other appropriate computing device. The computer 701 may be standalone, or may be part of a subsystem, which may, in turn, be part of a larger system.

The processor 710 may include one or more known processing devices, such as a microprocessor from the Intel Core™ family manufactured by Intel™, the Phenom™ family manufactured by AMD™, or any of various processors manufactured by Sun Microsystems. The memory 720 may include one or more storage devices configured to store information used by the processor 710 to perform certain functions related to disclosed embodiments. The storage 730 may include a volatile or non-volatile, magnetic, semiconductor, tape, optical, removable, non-removable, or other type of computer-readable medium used as a storage device.

In one embodiment, the memory 720 may include one or more programs or subprograms that may be loaded from the storage 730 or elsewhere that, when executed by the computer 701, perform various procedures, operations, or processes consistent with disclosed embodiments. For example, the memory 720 may include a trackable postage program 725 for providing postage, tracking numbers, and serial numbers, tracking postage in transit, providing tracking information to a user, etc. The memory 720 may also include other programs that perform other functions and processes, such as programs that provide communication support, Internet access, etc. The trackable postage program 725 may be embodied as a single program, or alternatively, may include multiple sub-programs on one or more devices that, when executed, operate together to perform the function of the trackable postage program 725 according to disclosed embodiments.

The computer 701 may communicate over a link 745 with a network 740. For example, the link 745 may be a direct communication link, a LAN, a WAN, or other suitable connection. The network 740 may include the internet, as well as other systems.

The computer 701 may include one or more I/O devices that allow data to be received and/or transmitted by the computer 701. I/O devices may also include one or more digital and/or analog communication input/output devices that allow the computer 701 to communicate with other machines and devices. I/O devices may also include input devices such as a keyboard or a mouse, and may include output devices such as a display or a printer.

While the teachings have been described with reference to the examples of embodiments, those skilled in the art will be able to make various modifications to the described embodiments without departing from the true spirit and scope. The terms and descriptions used herein are set forth by way of illustration only and are not meant as limitations. In particular, although the method has been described in a specific order of steps, the steps of the method may be performed in a different order than illustrated, or may be performed simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   capturing, at a location and via a delivery processing system and using a camera device, an image of a delivery item comprising a postal tracking product, wherein the postal tracking product comprises a postage stamp integrated with a tracking bar code;
   processing the image to extract a tracking number from the tracking bar code;
   reporting, to a product tracking and reporting system, information comprising an indication of the location and the tracking number;
   receiving, from a user via an application, a request to access a tracking interface of the product tracking and reporting system, wherein the request comprises a serial number associated with the tracking number; and
   providing, to the user and in response to receiving the request, the location and information describing features or services associated with the delivery item;
   whereby the application performs operations comprising:
      extracting, from a serial barcode associated with the postal tracking product, the serial number and a domain name or an Internet Protocol address of a website associated with the tracking interface,
      automatically navigating the user to the website after the extracting the serial number from the serial barcode, and
      automatically entering the serial number associated with the tracking number into the tracking interface via the website, wherein the providing the location and the information describing features or services associated with the delivery item is based on the automatically entering the serial number into the tracking interface.

2. The method of claim 1, wherein the tracking number is the serial number.

3. The method of claim 1, wherein the user captures an image of the serial bar code comprising the serial number using the application on a mobile device.

4. The method of claim 1, further comprising:
   providing the postal tracking product to the user via the website associated with the tracking interface; and
   associating the serial number with an account; and
   wherein providing, to the user, the location further comprises:
      determining that the serial number is associated with the account before providing the location.

5. The method of claim 1, wherein the tracking bar code: is a 12 module by 36 module data matrix; uses a ECC200 error correction code; and is an overall symbol grade "A", based on the ISO/IEC standard provided in ISO/IEC 15416: 2000, measured with a ten millimeter aperture in the red spectral range between 630 nanometers and 675 nanometers.

6. The method of claim 1, wherein the tracking bar code comprises 22 data blocks comprising:
   a two-digit Retail Channel Application Identifier;
   a three-digit Service Type Code;
   a single-digit channel identifier;
   a six-digit mailer identifier;
   a nine-digit tracking number; and
   a single-digit modulus 10 check digit.

7. The method of claim 1, wherein the serial number is associated with a plurality of tracking numbers.

8. A system comprising:
   a processing system comprising one or more processors; and
   a memory system comprising one or more computer-readable media, wherein the one or more computer-readable media contain instructions that, when executed by the processing system, cause the processing system to perform operations comprising:
      capturing, at a location and via a delivery processing system, an image of a delivery item comprising a postal tracking product, wherein the postal tracking product comprises a postage stamp integrated with a tracking bar code;
      processing the image to extract a tracking number from the tracking bar code;
      reporting, to a product tracking and reporting system, information comprising an indication of the location and the tracking number;
      receiving, from a user via an application, a request to access a tracking interface of the product tracking and reporting system, wherein the request comprises a serial number associated with the tracking number;
      extracting, by the application, from a serial barcode associated with the postal tracking product, the serial number and a domain name or an Internet Protocol address of a website associated with the tracking interface;
      automatically navigating the user, via the application, to the website after the extracting, by the application, the serial number from the serial barcode;
      automatically entering, by the application, the serial number associated with the tracking number into the tracking interface via the website; and
      providing, by the application, to the user and in response to receiving the request, the location and information describing features or services associated with the delivery item based on the automatically entering, by the application, the serial number into the tracking interface.

9. The system of claim 8, wherein the tracking number is the serial number.

10. The system of claim 8, Wherein an image of the serial bar code is received via user input on the application residing in a mobile device.

11. The system of claim 8, the operations further comprising:
provide the postal tracking product to the user via the website associated with the tracking interface; and
associating the serial number with an account; and
wherein providing, to the user, the location further comprises:
determining that the serial number is associated with the account before providing the location.

12. The system of claim 8, wherein the tracking bar code: is a 12 module by 36 module data matrix; uses a ECC200 error correction code; is an overall symbol grade "A", based on the ISO/IEC standard provided in ISO/IEC 15416:2000, measured with a ten millimeter aperture in the red spectral range between 630 nanometers and 675 nanometers.

13. The system of claim 8, wherein the tracking bar code comprises 22 data blocks comprising:
a two-digit Retail Channel Application Identifier;
a three-digit Service Type Code;
a single-digit channel identifier;
a six-digit mailer identifier;
a nine-digit tracking number; and
a single-digit modulus 10 check digit.

14. The system of claim 8, wherein the serial number is associated with a plurality of tracking numbers.

15. A non-transitory computer readable storage medium comprising instructions for causing one or more processors to perform operations comprising:
capturing, at a location and via a delivery processing system, an image of a delivery item comprising a postal tracking product, wherein the postal tracking product comprises a postage stamp integrated with a tracking bar code;
processing the image to extract a tracking number from the tracking bar code;
reporting, to a product tracking and reporting system, information comprising an indication of the location and the tracking number;
receiving, from a user via an application, a request to access a tracking interface of the product tracking and reporting system, wherein the request comprises a serial number associated with the tracking number;
extracting, by the application, from a serial barcode associated with the postal tracking product, the serial number and a domain name or an Internet Protocol address of a website associated with the tracking interface;
automatically navigating the user, via the application, to the website after the extracting the serial number from the serial barcode;
automatically entering, by the application, the serial number associated with the tracking number into the tracking interface via the website; and
providing, by the application, to the user and in response to receiving the request, the location and information describing features or services associated with the delivery item based on the automatically entering, by the application, the serial number into the tracking interface.

16. The non-transitory computer readable storage medium of claim 15, wherein the tracking number is the serial number.

17. The non-transitory computer readable storage medium of claim 15, Wherein an image of the serial bar code is received via user input on the application residing in a mobile device.

18. The non-transitory computer readable storage medium of claim 15, the operations further comprising:
providing the postal tracking product to the user via the website associated with the tracking interface; and
associating the serial number with an account; and
wherein providing, to the user, the location further comprises:
determining that the serial number is associated with the account before providing the location.

19. The non-transitory computer readable storage medium of claim 15, wherein the tracking bar code: is a 12 module by 36 module data matrix; uses a ECC200 error correction code; is an overall symbol grade "A", based on the ISO/IEC standard provided in ISO/IEC 15416:2000, measured with a ten millimeter aperture in the red spectral range between 630 nanometers and 675 nanometers.

20. The non-transitory computer readable storage medium of claim 15, wherein the tracking bar code comprises 22 data blocks comprising:
a two-digit Retail Channel Application Identifier;
a three-digit Service Type Code;
a single-digit channel identifier;
a six-digit mailer identifier;
a nine-digit tracking number; and
a single-digit modulus 10 check digit.

21. The non-transitory computer readable storage medium of claim 15, wherein the serial number is associated with a plurality of tracking numbers.

* * * * *